United States Patent Office 2,917,550
Patented Dec. 15, 1959

2,917,550

4,4'-ALKYLIDENE-BIS-(2-TERT.-BUTYL PHENOLS)

Andrew J. Dietzler, Midland, Mich., assignor to The Dow Chemical Company, Midland, Mich., a corporation of Delaware No Drawing. Application May 4, 1956
Serial No. 582,644

1 Claim. (Cl. 260—619)

This invention concerns certain new chemical compounds which are 4,4'-alkylidene-bis-(2-tert.-butyl phenols) having the general formula:

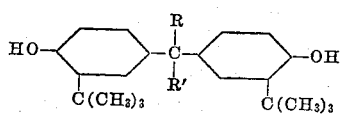

wherein R and R' represent alkyl radicals containing from 1 to 12 and from 1 to 9 carbon atoms, respectively.

The new compounds are useful as antioxidants, antimicrobial agents and in the preparation of phenol-formaldehyde resins. The compounds are especially useful as non-staining stabilizers for inhibiting the deterioration of plastics, e.g. polyethylene or polystyrene, upon exposure to light or heat in the presence of air or oxygen or upon exposure of molded plastic articles to out-of-doors weathering.

The 4,4'-alkylidene-bis-(2-tert.-butyl phenols) are prepared by reaction of 2-tert.-butyl phenol with a saturated aliphatic ketone containing from 3 to 21 carbon atoms in the molecule.

Examples of suitable ketones are acetone, methyl ethyl ketone, methyl n-propyl ketone, methyl isopropyl ketone, diethyl ketone, methyl n-butyl ketone, ethyl n-propyl ketone, methyl isobutyl ketone, ethyl isopropyl ketone, methyl sec.-butyl ketone, methyl tert.-butyl ketone, methyl n-amyl ketone, dipropyl ketone, diisopropyl ketone, diisobutyl ketone, hexamethyl acetone, methyl neo-pentyl ketone, methyl dodecyl ketone, ethyl dodecyl ketone, isopropyl dodecyl ketone or n-butyl dodecyl ketone.

The starting materials can be employed in proportions corresponding to from 3 to 10, preferably from 4 to 8, gram molecular proportions of the 2-tert.-butyl phenol per gram molecular proportion of the ketone.

The reaction can be carried out at temperatures between 20° and 60° C. in the presence of a hydrohalic acid, e.g. hydrogen chloride or hydrogen bromide, as condensing agent and an ionizable sulfur compound such as hydrogen sulfide, mercaptans, thiophenols or thioorganic acids as promoters, and at atmospheric pressure or thereabout or under superatmospheric pressures of from 5 to 30 pounds per square inch gauge pressure. Best results are usually obtained by carrying out the reaction in the presence of an ionizable sulfur compound such as hydrogen sulfide or an alkyl mercaptan in amount corresponding to from 0.03 to 0.2 gram atom of sulfur per gram mole of the ketone and under an autogenous pressure of the mixture of materials which usually is in the order of from 5 to 30 pounds per square inch. gauge.

In practice, a mixture of the 2-tert.-butyl phenol and the aliphatic ketone reactants are placed in a suitable reaction vessel in the desired proportions. An ionizable sulfur compound, e.g. hydrogen sulfide, methyl mercaptan, ethyl mercaptan or octanethiol, is added suitably in amount corresponding to from 0.03 to 0.2 gram atom of sulfur per gram mole of the ketone. Thereafter, the hydrohalic acid condensing agent, e.g. hydrogen chloride, hydrogen bromide or a mixture of the same, is added suitably in amount sufficient to maintain the mixture saturated or substantially saturated with respect to the hydrohalic acid at atmospheric or superatmospheric pressures of from 5 to 30 pounds per square inch gauge pressure. The mixture is maintained at reaction temperatures between 20° and 60° C. Substantial yields of the desired product are usually obtained in a reaction time of from one to three hours, but best results are obtained by allowing the reaction mixture to stand at room temperature for a period of from one to three days or longer before attempting separation of the bisphenol product.

The product is recovered in usual ways such as by dissolving the reaction mixture in a water-immiscible organic solvent, e.g. benzene, toluene, chlorobenzene, etc., washing the mixture with water and separating the aqueous and organic layers. The product is separated from the solvent in usual ways, e.g. by heating the solution to distill and separate the components from one another or by distilling off the solvent and separating the unreacted 2-tert.-butyl phenol from the product or by crystallization of the product. In a preferred procedure the reaction mixture is dissolved in a solvent such as benzene or chlorobenzene, is washed with water and the aqueous layer is heated, preferably under reduced pressure to distill the solvent and unreacted 2-tert.-butyl phenol. The residue is then subjected to steaming, i.e. bubbled with steam at reduced pressures, to remove residual traces of the unreacted 2-tert.-butyl phenol from the product. The product is thereafter dried in usual ways, e.g. by heating in a vacuum oven or by passing a stream of inert gas such as nitrogen therethrough.

The following examples illustrate ways in which the principle of the invention has been applied, but are not to be construed as limiting its scope.

EXAMPLE 1

A charge of 426 grams (2.84 moles) of 2-tert.-butyl phenol and 41.2 grams (0.71 mole) of acetone was placed in a glass reaction vessel equipped with a reflux condenser and stirrer. The mixture was stirred and hydrogen sulfide gas was bubbled into the solution at a temperature of 20° C. until it was saturated with respect to the H₂S. A total of 9.6 grams of hydrogen sulfide was absorbed in the solution. Thereafter, dry hydrogen chloride was bubbled into the mixture at temperatures between 22° and 23° C. over a period of 50 minutes. The mixture was saturated with the hydrogen chloride. The resulting mixture was allowed to stand at room temperature over a period of 3 days, after which time the mixture consisted of a slurry of crystalline and liquid materials. The reacted mixture was warmed to 60° C. and was mixed with 100 cc. of chlorobenzene and 100 cc. of water. The layers did not readily separate. A charge of 150 cc. of benzene was added. Upon standing the mixture separated into an aqueous and an organic layer. The layers were separated. The organic layer was washed three times, each with a 100 cc. portion of water, then was distilled. There was obtained 202 grams (1.35 moles) of 2-tert.-butyl phenol boiling at 110°–120° C. at 25 millimeters absolute pressure. The residue was bubbled with steam at 160° C. and 10 millimeters absolute pressure, then dried by heating at 170° C. at 5 millimeters pressure. There was obtained 219 grams of 4,4'-isopropylidene-bis-(2-tert.-butyl phenol) as a clear amber colored brittle product. The product was dissolved in petroleum ether (B.P. 86°–100° C.) and was crystallized by cooling. It was obtained as white crystals melting at 114.2°–114.6° C. The crystalline product was analyzed. It had the composition:

|  | Theory, percent | Found, percent |
|---|---|---|
| Carbon | 81.1 | 80.3 |
| Hydrogen | 9.5 | 9.6 |

4,4'-isopropylidene-bis-(2-tert.-butyl phenol) is a new chemical compound having the formula:

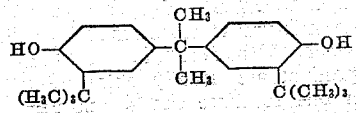

EXAMPLE 2

A charge of 300 grams (2 moles) of 2-tert.-butyl phenol and 99.2 grams (0.5 mole) of methyl dodecyl ketone, together with 1 cc. of octanethiol as promoter, were placed in a glass reaction vessel equipped with a reflux condenser and stirrer. Hydrogen chloride was bubbled into the mixture while stirring at temperatures between 23° and 27° C. over a period of 2 hours. Thereafter, the mixture was allowed to stand at room temperature for a period of 2 days. The reacted mixture was heated to 50° C. and was blown with nitrogen gas to remove dissolved hydrogen chloride over a period of 4 hours, then was heated under reduced pressure to distill unreacted 2-tert.-butyl phenol. The mixture was heated at an absolute pressure of 20 millimeters until the residue remaining in the still pot was being heated at a temperature of 170° C. There was obtained 186.4 grams of 2-tert.-butyl phenol boiling at temperatures up to 117° C. at 20 millimeters. The residue was blown with steam at temperatures between 150° and 160° C. at 20 millimeters absolute pressure, then was dried by blowing with nitrogen gas at a temperature of 160° C. There was obtained 174 grams (0.36 mole) of 4,4'-(1-methyldodecylidene)-bis-(2-tert.-butyl phenol) as a viscous amber colored liquid. It was analyzed and found to contain:

|  | Theory | Found |
|---|---|---|
| Carbon | 82.5 | 82.3 |
| Hydrogen | 10.9 | 11.1 |

4,4'-(1-methyldodecylidene)-bis-(2-tert.-butyl phenol) has the formula:

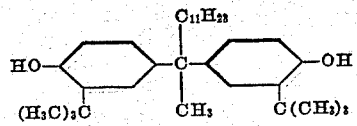

EXAMPLE 3

A charge of 600 grams (4 moles) of 2-tert.-butyl phenol, 72.1 grams (1 mole) of 2-butanone and 1 cc. of octanethiol were placed in a glass reaction vessel equipped with a reflux condenser and stirrer. The mixture was stirred. Dry hydrogen chloride was bubbled into the solution at temperatures between 26° and 31° C. over a period of 1.5 hours, keeping the solution saturated with respect to the HCl gas. The resulting mixture was allowed to stand at room temperature for a period of 6 days. Thereafter, it was blown with nitrogen gas at a temperature of 50° C. for a period of 3 hours, then was heated under reduced pressure to distill and separate unreacted 2-tert.-butyl phenol. The mixture was heated at an absolute pressure of 15 millimeters until the material in the still pot was being heated at a temperature of 180° C. There was obtained 332 grams of 2-tert.-butyl phenol boiling at temperatures up to 120° C. at 15 millimeters. The residue was blown with steam at temperatures between 150° and 160° C. at 15 millimeters absolute pressure and was dried by blowing with nitrogen. There was obtained 293.3 grams (0.83 mole) of 4,4'-sec.-butylidene-bis-(2-tert.-butyl phenol) as an amber colored brittle solid. It was analyzed and found to contain:

|  | Theory | Found |
|---|---|---|
| Carbon | 81.3 | 81.24 |
| Hydrogen | 9.66 | 9.62 |

4,4'-sec.-butylidene-bis-(2-tert.-butyl phenol) has the formula:

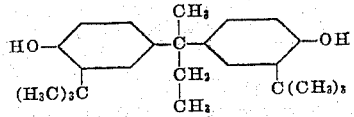

EXAMPLE 4

A charge of 450 grams (3 moles) of 2-tert.-butyl phenol, 84.7 grams (0.3 mole) of 10-nonadecanone and 2 cc. of octanethiol were placed in a glass reaction vessel equipped with a reflux condenser and stirrer. The mixture was stirred and hydrogen chloride gas bubbled through the solution for a period of 3 hours at temperatures between 30° and 43° C. A total of 9 grams of HCl were dissolved in the mixture. The mixture was sealed in a stoppered container and allowed to stand at room temperature for a period of 45 days. Thereafter, the mixture was subjected to distillation. It was heated at an absolute pressure of 20 millimeters until the material in the still pot was at a temperature of 190° C. There was obtained 388 grams (2.59 moles) of unreacted 2-tert.-butyl phenol distilling at temperatures between 110° and 120° C. at 20 millimeters. The residue was bubbled with steam at temperatures between 160° and 180° C. at 20 millimeters, then blown with nitrogen gas at 150°–165° C. to dry the material. There was obtained 109.7 grams of 4,4'-(1-nonyldecylidene)bis-(2-tert.-butyl phenol) as a viscous reddish brown colored liquid. It was analyzed and found to contain:

|  | Theory | Found |
|---|---|---|
| Carbon | 83.0 | 83.0 |
| Hydrogen | 11.4 | 10.9 |

4,4'-(1-nonyldecylidene)-bis-(2-tert.-butyl phenol) has the formula:

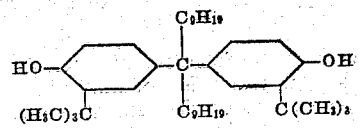

EXAMPLE 5

A charge of 49.5 pounds (0.33 mole) of 2-tert.-butyl phenol, 2.14 pounds of acetone and 60 cc. of octanethiol as promoter, were placed in a 10 gallon Pfaudler glass lined reactor equipped with a stirrer and means for heating and cooling the contents of the vessel. The mixture was stirred. Dry hydrogen chloride gas was added in amount sufficient to maintain a pressure between 4 and 20 pounds per square inch gauge pressure within the vessel over a period of 19 hours. Stirring was discontinued after the first 8 hours and the mixture allowed to stand quiescent for the remaining 11 hours of the reaction time. The pressure was released. The mixture was bubbled with nitrogen gas at a temperature of 60° C. for a period of 5.5 hours, then stirred and evacuated to remove dissolved HCl. The reacted mixture was removed and subjected to distillation to recover the unreacted 2-tert.-butyl phenol and separate it from the bis-phenol product. There was obtained 31.7 pounds of unreacted 2-tert.-butyl phenol boiling at temperatures between 90° C. at 10 millimeters and 111° C. at 6 millimeters, absolute pressure. The residue was steamed at temperatures between 145° and 156° C. at 31 millimeters pressure then dried. There was obtained 17 pounds of 4,4'-isopropylidene-bis-(2-tert.-butyl phenol) as a crystalline product having a freezing point of 105° C.

EXAMPLE 6

A purpose of this example is to illustrate a utility as antioxidants for the 4,4'-alkylidene-bis-(2-tert.-butyl phenols) of the invention.

In each of a series of experiments, polyethylene, together with 0.1 percent by weight of a 4,4'-alkylidene-bis-(2-tert.-butyl phenol) as identified in the following table, was dissolved in ortho-xylene to form a solution containing 40 percent by weight of the polyethylene. A layer of the solution was cast on a clean glass plate and dried to form a film 30 mils thick. Test discs 1.75 inches in diameter were cut from the dried film. These test discs were employed to determine the effect of the added agent in inhibiting the absorption of oxygen by the polyethylene. The procedure for determining the hinhibiting effect was to maintain a test disc in contact with 250 cc. of gaseous oxygen which was recirculated over the test disc as a stream at a rate of 500 cc. per minute at a temperature of 150° C. and 760 millimeters absolute pressure, employing procedure similar to that employed by R. H. Dornte, Ind. Eng. Chem., vol. 28, pp. 26–30, 1936, for determining the oxidation of white oils. The volume of the oxygen was measured at regular intervals of time. A graph of the change in volume of oxygen, i.e. the volume of oxygen absorbed, versus time was plotted. After the change in the volume of oxygen reached a constant value per unit of time, usually after about 25 to 30 cc. of the oxygen was consumed, the measurements were discontinued. A smooth curve was drawn through the points plotted on the graph and the curve extrapolated to zero. The time at zero absorption of oxygen represents the time for which the added agent was effective in inhibiting oxidation of the polyethylene and is a measure of the antioxidative properties of the compound.

The following table identifies the 4,4'-alkylidene-bis-(2-tert.-butyl phenols) employed in the experiments and gives the induction time, i.e. the time in hours for which the compound was effective in inhibiting oxidation of the polyethylene, under the test conditions. For purpose of comparison 4,4'-isopropylidene-bisphenol and 4,4'-isopropylidene-bis-(2-isopropyl phenol) were tested in similar manner.

Table

| Stabilizing Compound | Percent | Induction Time, Hrs. |
|---|---|---|
| 4,4'-isopropylidene-bisphenol | 0.1 | 3.8 |
| 4,4'-isopropylidene-bis-(2-isopropylphenol) | 0.1 | 10.8 |
| 4,4'-sec.-butylidene-bis-(2-tert.-butyl phenol) | 0.1 | 18.2 |
| 4,4'-[1-methyldodecylidene-bis-(2-tert.-butyl phenol)] | 0.1 | 23.0 |
| 4,4'-isopropylidene-bis-(2-tert.-butyl phenol) | 0.1 | 29.4 |

I claim:

4,4'-isopropylidene-bis-(2-tert.-butyl phenol), a white crystalline compound melting at 114°–115° C.

References Cited in the file of this patent

UNITED STATES PATENTS

| 2,482,748 | Dietzler | Sept. 27, 1949 |
| 2,535,015 | Johnson et al. | Dec. 19, 1950 |
| 2,745,726 | Young et al. | May 15, 1956 |
| 2,829,175 | Bowman et al. | Apr. 1, 1958 |

OTHER REFERENCES

Seebach: Chem. Abstracts, vol. 32, col. 1009 (1938), 1 page.